US007826860B2

(12) United States Patent
Worfolk et al.

(10) Patent No.: US 7,826,860 B2
(45) Date of Patent: *Nov. 2, 2010

(54) SYNCHRONIZATION OF MEDIA ACCESS CONTROL (MAC) SUPERFRAMES

(75) Inventors: Patrick Worfolk, Campbell, CA (US); Xiaoming Zhou, Sunnyvale, CA (US)

(73) Assignee: NDSSI Holdings, LLC, San Jose, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/231,563

(22) Filed: Sep. 4, 2008

(65) Prior Publication Data

US 2009/0010245 A1 Jan. 8, 2009

Related U.S. Application Data

(63) Continuation of application No. 11/239,584, filed on Sep. 29, 2005, now Pat. No. 7,480,515.

(51) Int. Cl.
*H04B 7/00* (2006.01)
*H04B 15/00* (2006.01)

(52) U.S. Cl. ............... 455/502; 455/41.2; 455/519; 370/503; 370/350

(58) Field of Classification Search .............. 455/502, 455/41.2, 516, 519, 423; 370/347, 252, 503, 370/329, 338, 401, 345, 350, 341, 400, 336
See application file for complete search history.

(56) References Cited

U.S. PATENT DOCUMENTS

| | | | |
|---|---|---|---|
| 2002/0114303 A1 | 8/2002 | Crosbie et al. |
| 2004/0214527 A1 | 10/2004 | Lim |
| 2005/0089058 A1 | 4/2005 | Hong et al. |
| 2005/0185628 A1 | 8/2005 | Watanabe |
| 2005/0185669 A1 | 8/2005 | Welborn et al. |
| 2006/0198337 A1 | 9/2006 | Hoang et al. |
| 2007/0054680 A1 | 3/2007 | Mo et al. |
| 2008/0013519 A1 | 1/2008 | Kwon et al. |
| 2008/0137599 A1 | 6/2008 | Ham et al. |
| 2008/0151940 A1 | 6/2008 | Fanson et al. |

*Primary Examiner*—Sujatha Sharma
(74) *Attorney, Agent, or Firm*—Brian R. Short

(57) ABSTRACT

A device and method for of synchronizing a MAC superframe of a wireless device is disclosed. The wireless device can be located within a chain of a plurality of other wireless devices. The method includes receiving beacons from at least one other device during a superframe of the wireless device, determining a superframe offset for each of the other wireless devices based on timing of the received beacons, determining a corrective delay based on the superframe offsets, inserting the corrective delay within a current superframe of the wireless device, and inserting a predictive delay within the current superframe, the predictive delay being determined by an estimate of a difference between a frequency a clock of the wireless device and a frequency of a slowest clock of the other wireless devices within the chain.

20 Claims, 8 Drawing Sheets

SYNCHRONIZATION OF MEDIA ACCESS CONTROL (MAC) SUPERFRAMES

RELATED APPLICATIONS

This patent application is a continuation of patent application Ser. No. 11/239,584, having the same title and filed Sep. 29, 2005 now U.S. Pat. No. 7,480,515.

FIELD OF THE INVENTION

The invention relates generally to communication systems. More particularly, the invention relates to an apparatus and method for improving synchronization of wireless media access control (MAC) superframes.

BACKGROUND OF THE INVENTION

Home networking is evolving into an environment in which people will be sharing photographs, music, video, data and voice among networked consumer electronics, personal computers and mobile devices throughout the home. Consumers will be able to stream video content from a personal computer or electronic device to flat panel high-definition television (HDTV) without the use of wires. A technology being implemented for enabling these capabilities is ultra wideband (UWB). UWB is a wireless technology designed for short-range, personal area networks.

FIG. 1 shows an example of an indoor broadband wireless communication network. The network includes, for example, a high definition television (HDTV) monitor 110 networked with other devices, such as, a digital video recorder (DVR) 120, a digital video disk (DVD) player 140 and a computing device 130.

HDTV streaming video requires large bandwidths of information. Therefore, the networking of devices that include streaming HDTV must be capable of handling high bandwidths. Additionally, the devices of the network must be resistant to both self-interference and interference from other wireless communication signals. UWB wireless signals operate at very low power levels, making resistance to interference more difficult.

Networking of multiple UWB devices 110, 120, 130, 140 requires the UWB devices 110, 120, 130, 140 to be synchronized so the transmission between the devices 110, 120, 130, 140 can be coordinated. Receiving devices and transmitting devices must know when data transmission between the devices will occur. The scheduling of the data transmission is generally performed through media access control (MAC) scheduling. The transmission occurs during data exchange periods of superframes of the UWB devices. To properly operate, the data exchange periods of the superframes of the UWB devices must be synchronized. Synchronization can be difficult because crystals within the wireless devices that generate clock signals typically drift. Improving (increasing) the accuracy of the crystals can be very expensive.

The superframes of each wireless device 110, 120, 130, 140 are divided into slots of fixed duration. MAC control information is exchanged through the transmission and reception of beacons in a contention-free manner during initial slots in the superframe. The remaining slots are available for the exchange of data. The protocol allows each device 110, 120, 130, 140 to use beacons to reserve specific slots for data transmission without contention. The superframes of each wireless device 110, 120, 130, 140 need to be synchronized so that data transmission between the devices 110, 120, 130, 140 occurs at expected times. A lack of proper synchronization between the devices can cause a loss of transmission data, or undesirably slow the transmission of data.

It is desirable to improve or enhance synchronization of wireless devices of a network without requiring expensive improvements in the performance of crystals within the wireless devices that generate clock signals within the wireless devices.

SUMMARY OF THE INVENTION

An embodiment of the invention includes a method of synchronizing a MAC superframe of a wireless device to at least one neighboring wireless device, the wireless device being located within a plurality of other wireless devices. The method includes receiving beacons from at least one other device during a superframe of the wireless device, determining a corrective delay based on a time difference between an actual beacon reception time and an expected beacon reception time, inserting the corrective delay within a current superframe of the wireless device, determining a predictive delay by estimating a frequency difference between a frequency a clock of the wireless device and a frequency of a slowest clock of the other wireless devices within the plurality of devices, and inserting the predictive delay within the current superframe.

Another embodiment includes a method of synchronizing a MAC superframe of a wireless device to at least one neighboring wireless device, the wireless device being located within a plurality of other wireless devices. The method includes receiving beacons from at least one other device during a superframe of the wireless device, determining a superframe offset for each of the other wireless devices based on timing of the received beacons, determining a corrective delay based on the superframe offsets, determining a predictive delay by estimating a difference between a frequency a clock of the wireless device and a frequency of a slowest clock of the other wireless devices within the plurality of devices, and inserting the predictive delay within the current superframe, wherein the estimate of the frequency of the slowest clock comprises computing an average over time of the corrective delay.

Other aspects and advantages of the present invention will become apparent from the following detailed description, taken in conjunction with the accompanying drawings, illustrating by way of example the principles of the invention.

DETAILED DESCRIPTION

The invention includes an apparatus and method for synchronizing wireless devices within a wireless mesh network.

The synchronization is obtained by inclusion of a corrective delay and a predictive delay within superframes of the wireless devices. The corrective delay and the predictive delay can be determined by analyzing timed reception of beacons received from other wireless devices. The corrective delay and the predictive delay help to minimize the effects of clock skew between the wireless devices.

Figure 1:
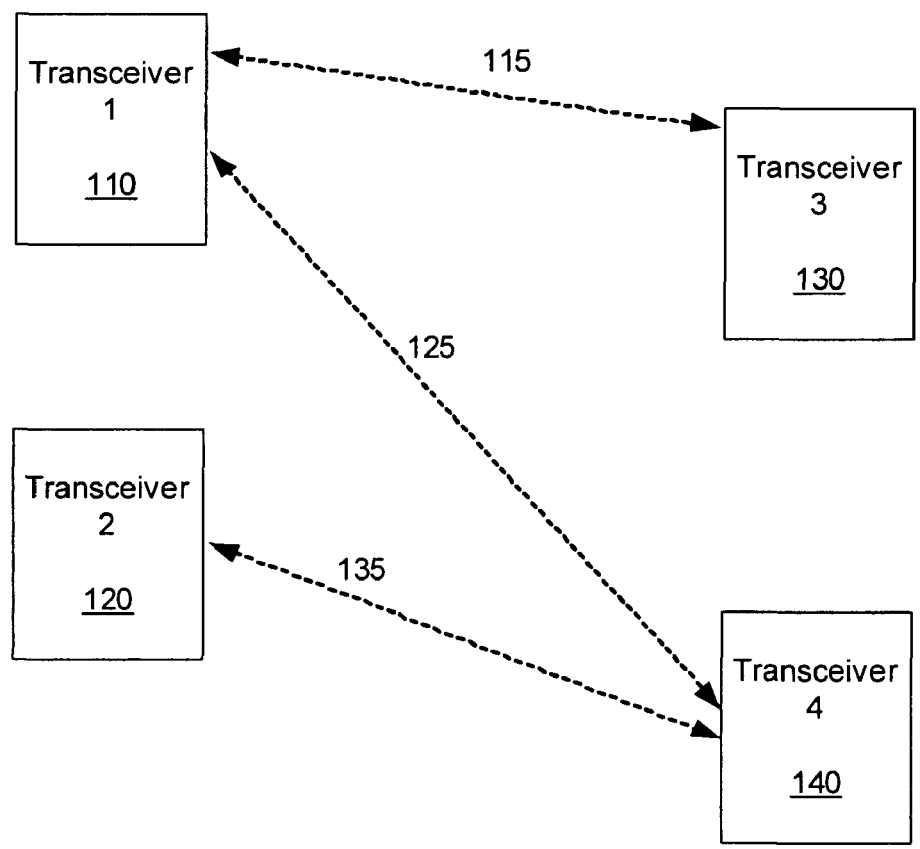
FIG. 1 shows a prior art wireless mesh network that includes wireless devices.
Figure 2:
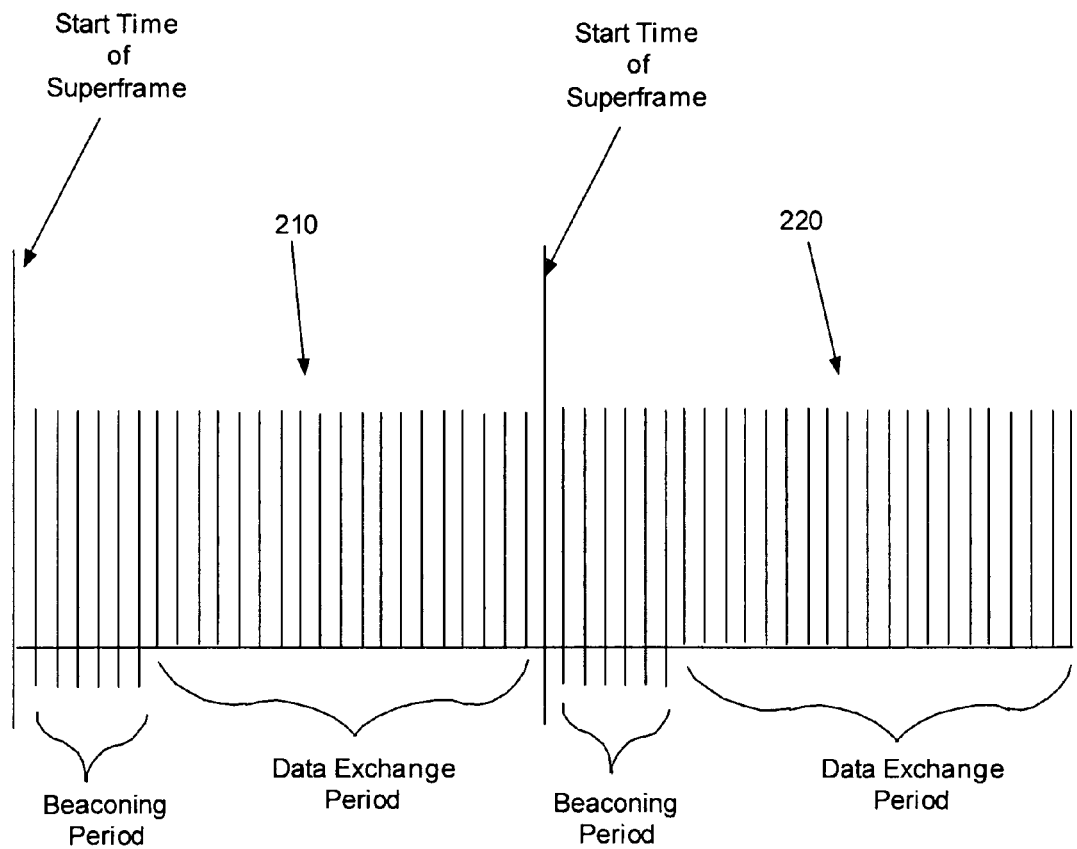
FIG. 2 shows multiple superframes of a wireless device.

FIG. 2 shows multiple superframes of a wireless device. The superframes 210, 220 each include a beaconing period and a data exchange period. The beaconing period allows the wireless device to synchronize with other devices by timing reception of beacons from the other devices. As will be described, the beaconing period is broken into slots in which a slot is allocated for each of the neighboring devices.

Superframe Offset

When a device receives a beacon from a neighboring device, the device determines the difference between the beacon's actual reception time and an expected (allocated) reception time. The expected reception time is determined from a beacon slot number field of the received beacon, the receiving device's superframe start time and an estimate of propagation delay. The difference between the actual beacon reception time and the expected beacon reception time can be referred to as the superframe offset of the device corresponding with the beacon. If the superframe offset is positive, then the neighbor device's superframe started later than the receiving device's superframe. In order to maintain superframe synchronization with such a neighboring device, the receiving device delays its own superframe by the superframe offset. The receiving device determines superframe offsets for all neighboring devices in which beacons are received.

Corrective Delay

Beacons are received from at least one other device during a superframe of the wireless device. A superframe offset is determined for each of the other wireless devices based on timing of the received beacons. From the superframe offsets, a corrective delay can be inserted within a current superframe of the device to improve synchronization between the current device and the other devices. The corrective delay is determined from the worst case (greatest) superframe offset of the neighboring devices.

The corrective delay is inserted within the current superframe of the wireless device. The corrective delay can be inserted any time following the detection of a slower device. An earlier adjustment of the offset through insertion of the corrective delay allows tighter synchronization with a slower neighboring device.

If a device does not receive a beacon from a neighbor, the device can use historical measurements to estimate the impact on superframe synchronization and adjust its corresponding superframe offset accordingly. An embodiment includes using a short term average of past superframe offsets to estimate a present superframe offset. A short term average may be implemented in numerous ways including averaging over a window or using an exponential averager.

Allocated Beacon Slots

Figure 3:
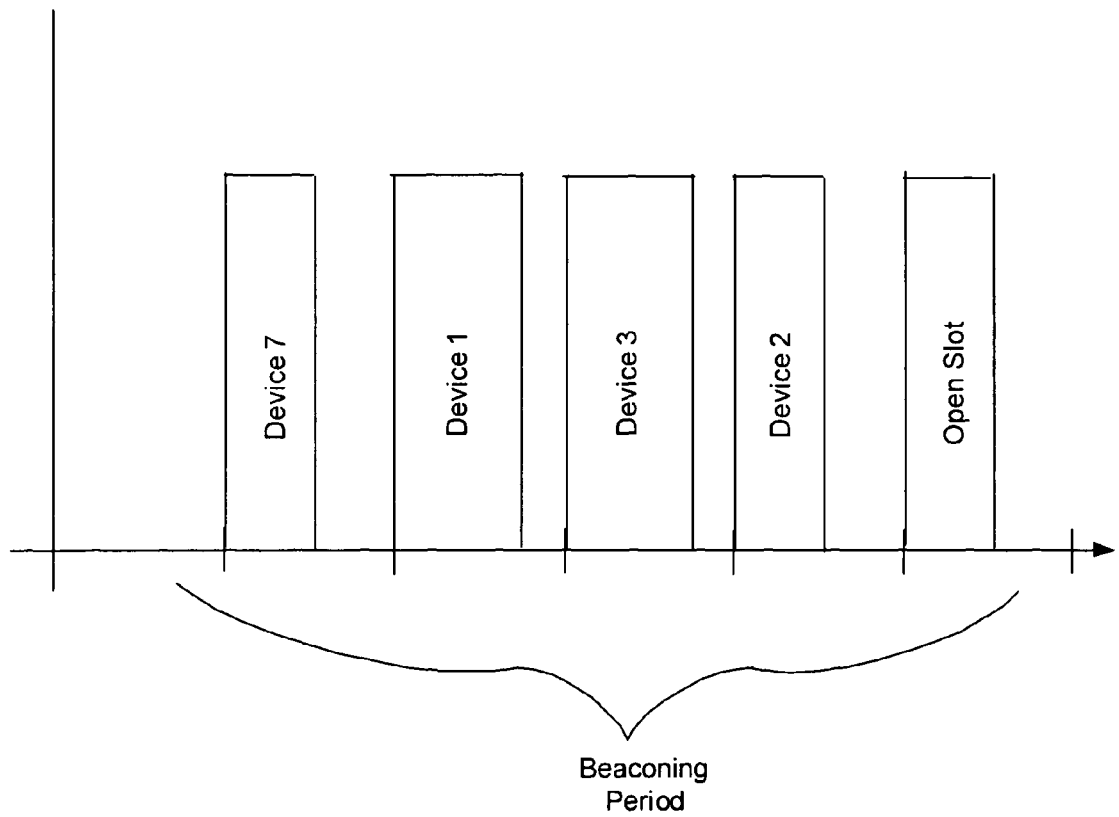
FIG. 3 shows a beaconing period of a superframe.

FIG. 3 shows a beaconing period of a superframe. As shown, each device has its own beacon slot in the beaconing period for transmission of its beacon.

All devices that are not sleeping, send beacons. A device scans channels for beacons. If no beacons are received, the device creates its own beacon period, and sends the first beacon. If a beacon is received, the device searches for a free beacon slot. Once a beacon slot is chosen, the device uses the same beacon slot until the beaconing period can be compressed, or a collision is detected.

The beacon slot locations of FIG. 3 include, for example, slots for DevID7, DevID1, DevID3 and DevID2. An open slot is depicted at the latest slots (Open Slot). A new device would most likely select the open slot as its beacon slot. The durations of the beacons can vary depending on beacon payload, but each slot has a fixed duration.

A receiving device can determine the superframe offset of neighboring devices by comparing the beacon slot allocations with the timing of beacons received from the corresponding neighboring devices.

Accumulated Delays of Chains of Devices

Figure 4:
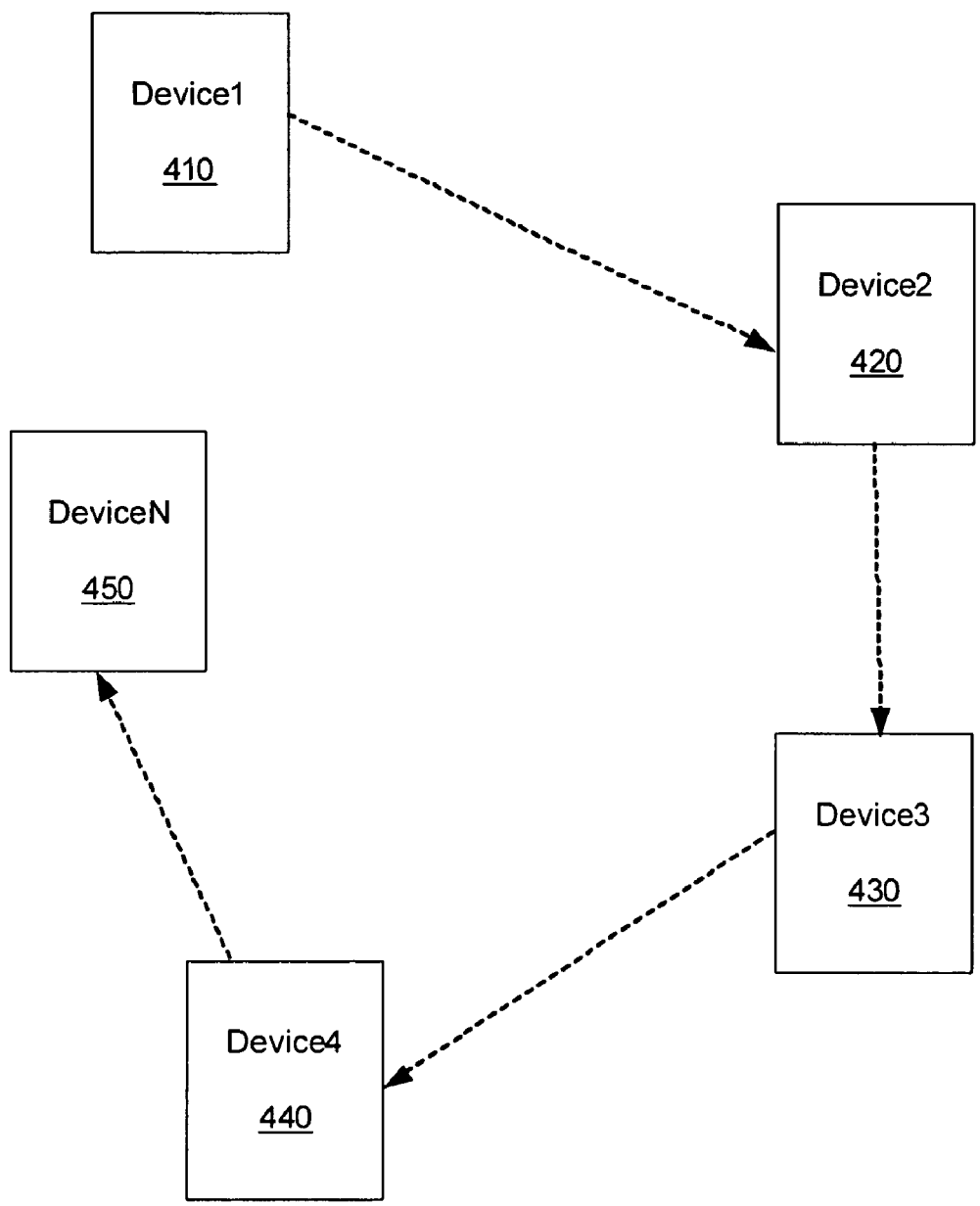
FIG. 4 shows a chain of wireless devices in which synchronization errors can accumulate along the chain.

FIG. 4 shows a chain of wireless devices 410, 420, 430, 440, 450 in which synchronization errors (offsets) can accumulate along the chain. The delay can propagate along the chain. For example, if the first device 410 has the slowest clock of all the devices in the chain, then the superframe of the second device 420 will start earlier than the superframe of the first device 410. Additionally, the superframe of the third device 430 will start earlier than the superframe of the second device 420, the superframe of the fourth device 440 will start earlier than the superframe of the third device 430, and the superframe of the Nth device 450 will start earlier than the superframe of the fourth device 440. If the tail (deviceN 450) and the head (device1 410) come into communications range, and if the accumulated offset is too large, the devices (device1 and deviceN) may not recognize each other as members of the same network. This is very undesirable and can cause disruptions to existing traffic flows through beaconing period relocation. Therefore, minimizing accumulated offset along a chain of wireless devices is important.

In a general mesh topology, an initial synchronization may occur along one path and later due to changes in the transmission environment or the introduction or loss of devices, a new synchronization path can arise. In this situation, the difference in accumulated offsets along the two paths can become significant. A way to decrease the accumulated offset is for the devices to compensate for their faster clock frequency prior to beacon transmission.

Accumulative Delay Analysis

For descriptive purposes, assume a chain includes N wireless devices, and that each device receives beacons only from the one device ahead of the present device, and the one device behind the present device in the chain. For example, device 2 only receives beacons from device1 and device3. Assuming a clock frequency of each device is given by $f_i$, and that the first device (device1) is the slowest (frequency $f_1$), then in an idealized model, the difference of the offsets of a device i is:

$\Delta_i = SF*((f_0/f_1)-(f_0/f_i))$; where SF is the superframe duration and $f_0$ is the clock frequency of the an ideal clock.

Figure 5:
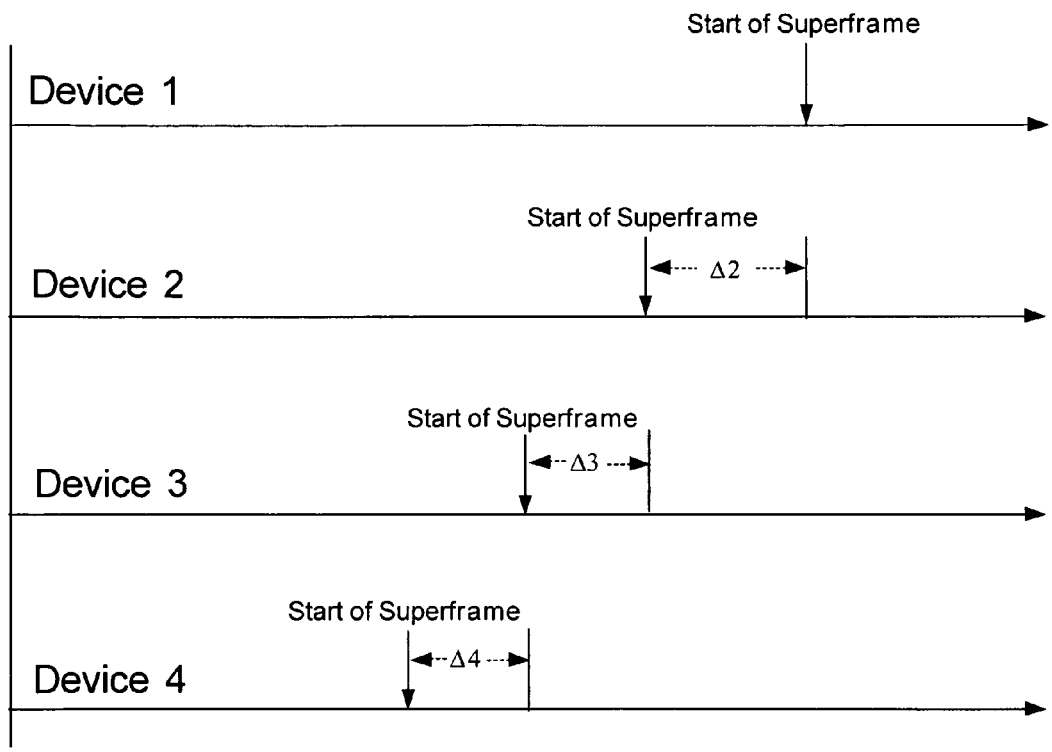
FIG. 5 shows time lines which depict an example of superframe offsets of a chain of wireless devices.

FIG. 5 shows time lines which depict an example of superframe offsets of the chain of wireless devices. Referencing the equation above, since $f_1 < f_i$, each $\Delta_i$ is positive and the offset of each device for each superframe is staggered as shown in FIG. 5.

The accumulated delay between device1 and deviceN is given by the sum $\Delta_2 + \ldots + \Delta_N$. The accumulated delay is proportional to both the number of hops between the device and the slowest device and the average skew between the devices on the path and the slowest device.

Predictive Delay

Figure 6:
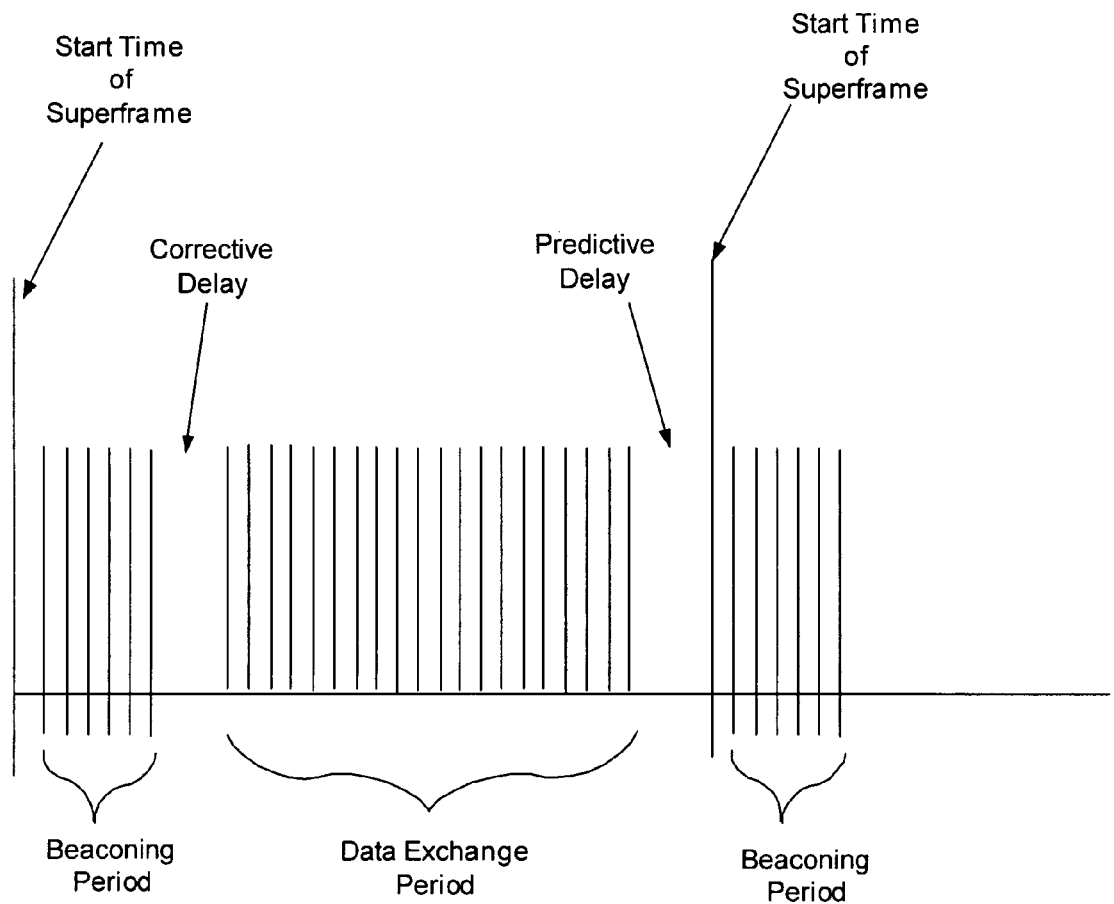
FIG. 6 shows a superframe that includes a corrective delay and a predictive delay.

FIG. 6 shows a superframe that includes a corrective delay and a predictive delay. The time line is an example, and not to scale. The corrective delay and predictive delay are represented as much larger than they typically would be for ease of depiction. The corrective delay and the predictive delay are inserted into a current superframe of the current device.

As previously described, the corrective delay is determined based upon the superframe offsets. The superframe offsets are determined based on timing of the received beacons. The predictive delay is determined from the corrective delays. One embodiment includes the predictive delay being determined from an average of a number of previous corrective delays. That is, the predictive delay is determined by an estimate of a difference between a frequency a clock of the current (receiving) wireless device and a frequency of a slowest clock of the other wireless devices within the chain.

FIG. 6 shows the corrective delay occurring directly after the beaconing period and the predictive delay occurring just before the start time of the next superframe. It is to be understood that the timing of the corrective delay and the predictive delay is not limited to this example. The corrective delay should generally occur before the data exchange of the current superframe. The predictive delay should generally occur after the current superframe beacon transmission and before the transmission by the device of its beacon for the next superframe.

Figure 7:
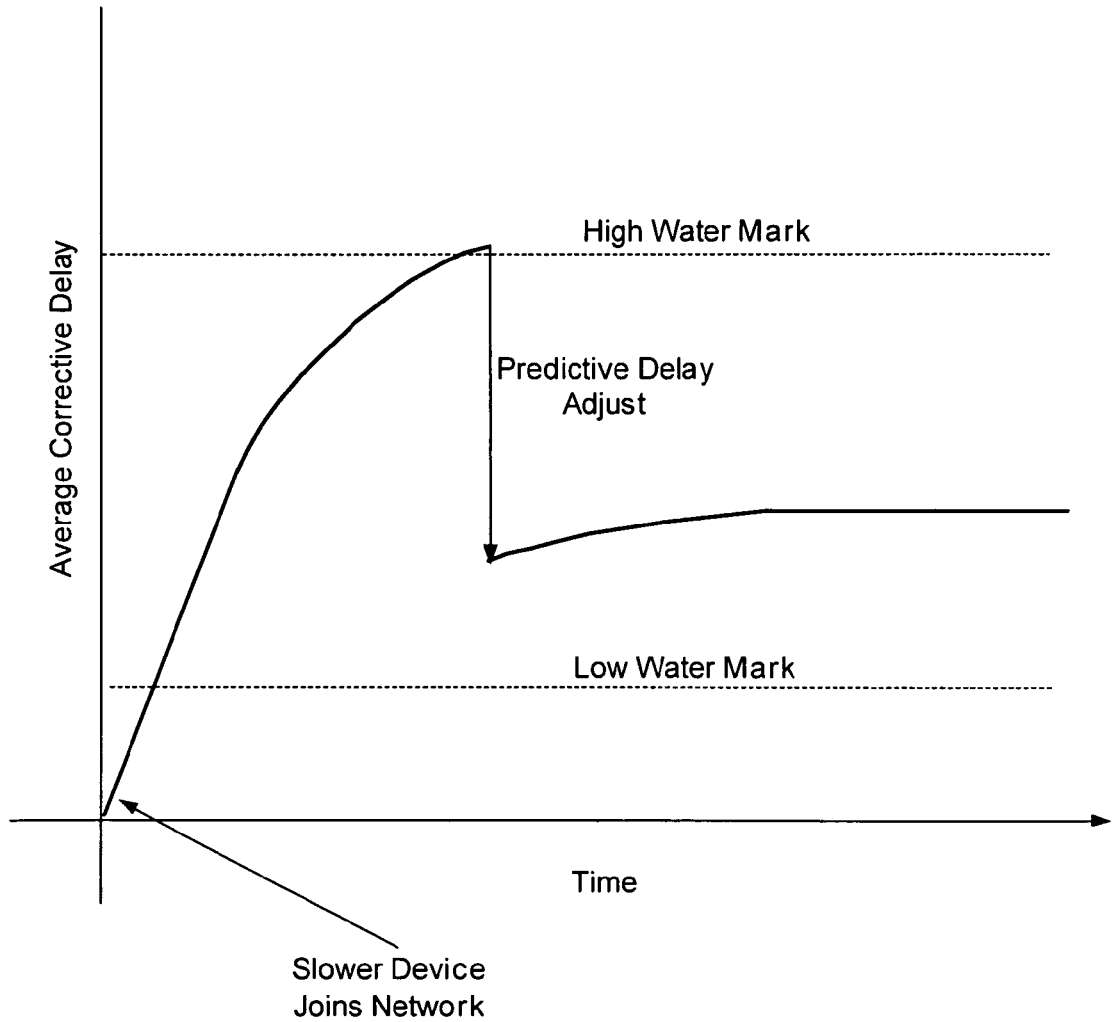
FIG. 7 is a plot that shows an example of average corrective delay over time.

FIG. 7 is a plot that shows a possible average corrective delay over time. The plot shows the average corrective delay increasing over time. This increase can happen, for example, if a slower clock device is introduced into the mesh network.

If the average corrective delay increases enough to exceed a high-water mark threshold, then the predictive delay is incremented (increased), compensating for the clock of the present device being faster than another device within a chain of devices. The resulting average corrective delay is decreased with the increase of the predictive delay.

A device updates its current corrective delay based upon superframe offsets of neighboring devices (as previously described). The average estimate of the corrective delay is updated, for example, according to the following equation:

Average=$(1-\epsilon)$*(previous average)+$\epsilon$*(corrective delay) in which $\epsilon$ is set depending on the desired averaging window.

If over time, the average corrective delay increases to be greater than the high water mark threshold (as shown in FIG. 7), then the predictive delay is incremented. Alternatively, if the average corrective delay decreases to be lower than the low water mark threshold, the predictive delay is decremented.

The predictive delay is typically incremented by the resolution of the clock signal. However, it is possible to increment by more than the resolution of the clock signal. The predictive delay, however, should not be incremented to exceed a predetermined threshold. The predetermined threshold can be determined based on knowledge of the accuracy of the crystals used to generate the clock signals. Typically, the predetermined threshold is based upon an estimation of the maximum clock skews between devices.

The predictive delay is typically decremented by the resolution of the clock signal. However, it is possible to decrement by more than the resolution of the clock signal. The predictive delay, however, should not be decremented to below zero.

When the predictive delay is increased (incremented), the average corrective delay should be decreased (decremented) by an equivalent amount. When the predictive delay is decreased (decremented), the average corrective delay should be increased (incremented) by an equivalent amount.

A high water mark threshold is set to be greater than the low water mark threshold plus the increment/decrement size. A low water mark threshold is less than the increment/decrement size, but greater than zero plus δ, where δ exceeds an estimate of an upper bound on the error in the average corrective delay estimate. The high water mark and low water mark as previously described, are only one of the possible implementation.

Figure 8:
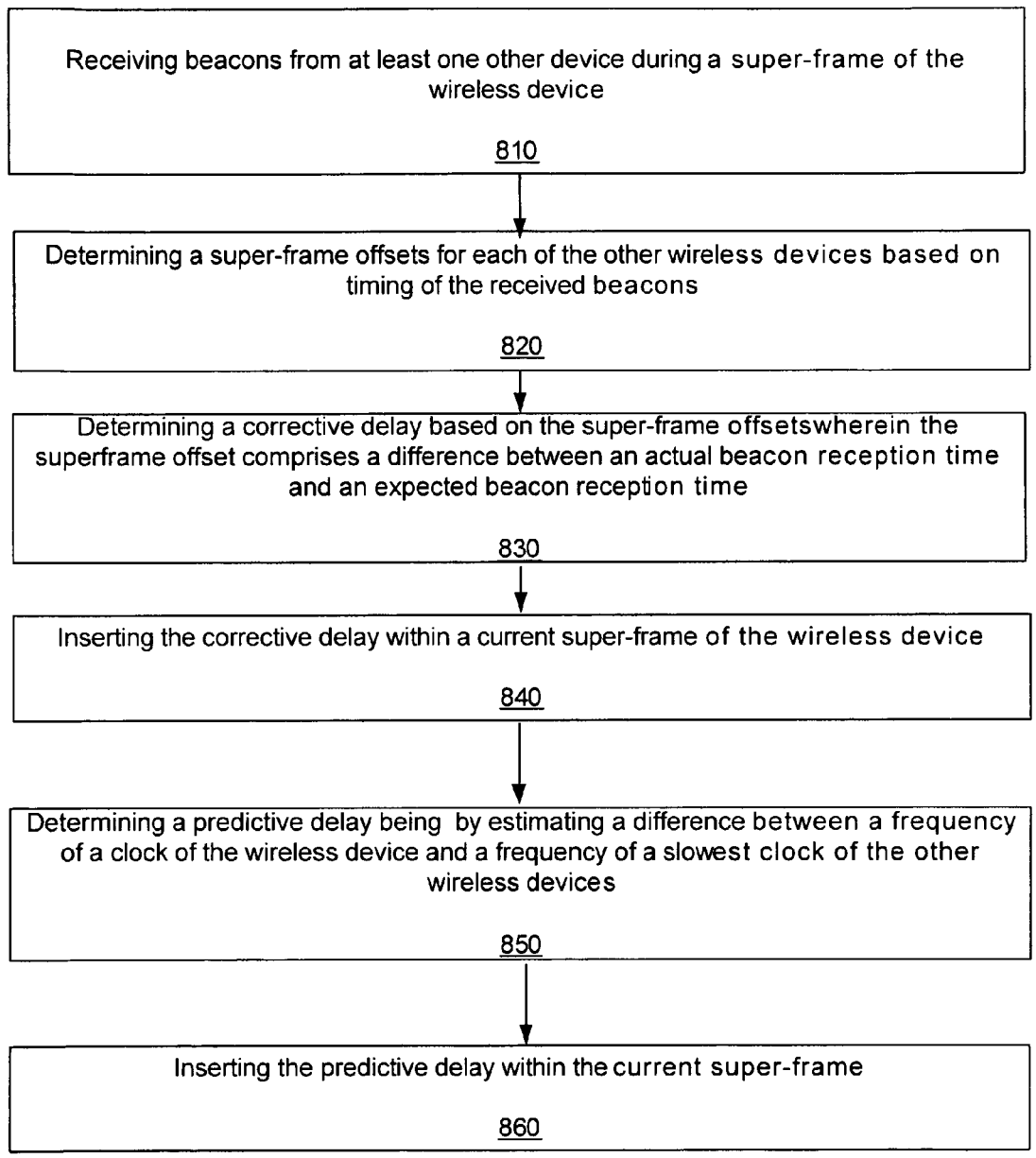
FIG. 8 is a flow chart showing steps included within a method of synchronizing wireless devices.

FIG. 8 is a flow chart showing steps included within a method of synchronizing wireless devices. A first step 810 includes receiving beacons from at least one other device during a superframe of the wireless device. A second step 820 includes determining a superframe offset for each of the other wireless devices based on timing of the received beacons. A third step 830 includes determining a corrective delay based on the superframe offsets wherein the superframe offset comprises a difference between an actual beacon reception time and an expected beacon reception time. That is, the corrective delay can be based a time difference between an actual beacon reception time and an expected beacon reception time. A fourth step 840 includes inserting the corrective delay within a current superframe of the wireless device. A fifth step 850 includes determining the predictive delay by estimating a difference between a frequency of a clock of the wireless device and a frequency of a slowest clock of the other wireless devices. A sixth step 860 includes inserting the predictive delay within the current superframe.

Missed Beacons

As previously stated, if a device does not receive a beacon from a neighbor, the device can use historical measurements to estimate the impact on superframe synchronization and estimate the corresponding superframe offset accordingly. An embodiment includes using an average of past superframe offsets to estimate a present superframe offset.

Although specific embodiments of the invention have been described and illustrated, the invention is not to be limited to the specific forms or arrangements of parts so described and illustrated. The invention is limited only by the appended claims.

What is claimed:

1. A method of synchronizing a MAC superframe of a wireless device to a MAC superframe of at least one neighboring device, the wireless device being located within a plurality of other wireless devices, the method comprising:
   receiving beacons from at least one other device during a superframe of the wireless device;
   determining a corrective delay based on the on a time difference between an actual beacon reception time and an expected beacon reception time;
   inserting the corrective delay within a current superframe of the wireless device;
   determining a predictive delay by estimating of a difference between a frequency of a clock of the wireless device and a frequency of a slowest clock of the other wireless devices within the plurality of devices;
   inserting the predictive delay within the current superframe.

2. The method of claim 1, further comprising the wireless device transmitting a beacon within the current superframe.

3. The method of claim 1, wherein the superframe offset of each other device is determined by an amount of time a beacon of the other device arrives at the wireless device later than expected.

4. The method of claim 1, further comprising the corrective delay being inserted within the current superframe as early as possible but after a beaconing period of the current superframe.

5. The method of claim 1, further comprising the predictive delay of a current superframe occurring prior to beacon transmission of a following superframe.

6. The method of claim 1, wherein the estimate of the frequency of the slowest clock comprises computing an average over time of the corrective delay.

7. The method of claim 6, wherein if the average exceeds a predetermined high-watermark threshold, then the predictive delay is increased.

8. The method of claim 7, wherein the high-water threshold is determined by a clock resolution of the wireless device.

9. The method of claim 7, wherein the predictive delay is incrementally increased by a clock resolution of the wireless device.

10. The method of claim 6, wherein if the average falls below a predetermined low-watermark threshold, then the predictive delay is decreased.

11. The method of claim 1, wherein if a beacon from another wireless device is missed, the wireless device determines the superframe offset of the other wireless device by averaging superframe offsets of previous superframes of the wireless device.

12. A method of synchronizing MAC superframes of wireless devices located within a plurality of wireless devices, the method comprising:
   each device transmitting a beacon;
   each device receiving beacons from at least one other device during a superframe of the wireless device;
   each device determining a superframe offset for each of the other wireless devices based on timing of the received beacons, wherein the superframe offset comprises a difference between an actual beacon reception time and an expected beacon reception time;
   each device determining a corrective delay based on the superframe offsets;
   each device inserting the corrective delay within a current superframe of the wireless device;
   each device determining a predictive delay by estimating of a difference between a frequency of a clock of the wireless device and a frequency of a slowest clock of the other wireless devices within the plurality of devices;
   each device inserting the predictive delay within the current superframe.

13. A method of synchronizing a MAC superframe of a wireless device, the wireless device being located within a plurality of other wireless devices, the method comprising:
   receiving beacons from at least one other device during a superframe of the wireless device;
   determining a superframe offset for each of the other wireless devices based on timing of the received beacons;
   determining a corrective delay based on the superframe offsets;
   determining a predictive delay by estimating of a difference between a frequency of a clock of the wireless device and a frequency of a slowest clock of the other wireless devices within the plurality of devices, wherein the estimate of the frequency of the slowest clock comprises computing an average over time of the corrective delay;
   inserting the predictive delay within the current superframe.

14. The method of claim 13, further comprising inserting the predictive delay of a current superframe prior to beacon transmission of a following superframe.

15. The method of claim 13, wherein the estimate of the frequency of the slowest clock comprises computing an average over time of the corrective delay.

16. The method of claim 15, wherein if the average exceeds a predetermined high-watermark threshold, then the predictive delay is increased.

17. The method of claim 16, wherein the predetermined high-water threshold is determined by a clock resolution of the wireless device.

18. The method of claim 16, wherein the predictive delay is incrementally increased by a clock resolution of the wireless device.

19. The method of claim 15, wherein if the average falls below a predetermined low-watermark threshold, then the predictive delay is decreased.

20. The method of claim 13, wherein if a beacon from another wireless device is missed, the wireless device determines the superframe offset of the other wireless device by averaging superframe offsets of previous superframes of the wireless device.

* * * * *